United States Patent
Kamo et al.

(10) Patent No.: US 11,065,831 B2
(45) Date of Patent: Jul. 20, 2021

(54) METHOD FOR DESIGNING COMPOSITE MATERIAL AND COMPOSITE MATERIAL

(71) Applicant: MITSUBISHI HEAVY INDUSTRIES, LTD., Tokyo (JP)

(72) Inventors: Sota Kamo, Tokyo (JP); Kiyoka Takagi, Tokyo (JP); Tooru Shitani, Tokyo (JP); Toshio Abe, Nagoya (JP); Shinya Honda, Sapporo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 16/057,099

(22) Filed: Aug. 7, 2018

(65) Prior Publication Data
US 2019/0047237 A1   Feb. 14, 2019

(30) Foreign Application Priority Data
Aug. 9, 2017   (JP) .............................. JP2017-154631

(51) Int. Cl.
*B29C 70/54*   (2006.01)
*G06F 30/00*   (2020.01)
(Continued)

(52) U.S. Cl.
CPC ............. *B29C 70/54* (2013.01); *G06F 30/00* (2020.01); *G06F 30/17* (2020.01); *G06F 2113/26* (2020.01)

(58) Field of Classification Search
CPC ...... G06F 30/00; G06F 30/17; G06F 2113/26; B29C 70/54
See application file for complete search history.

(56) References Cited

U.S. PATENT DOCUMENTS

| | | | |
|---|---|---|---|
| 8,756,037 B2 | 6/2014 | Rassaian et al. | |
| 2007/0208443 A1* | 9/2007 | Caprioli | G06F 30/15 700/97 |

(Continued)

FOREIGN PATENT DOCUMENTS

JP   5972062   7/2016

OTHER PUBLICATIONS

Todoroki, A., Watanabeh, K. and Kobayashi, H., 1995. Application of genetic algorithms to stiffness optimization of laminated composite plates with stress-concentrated open holes. JSME international journal. Ser. A, Mechanics and material engineering, 38(4), pp. 458-464. (Year: 1995).*

(Continued)

*Primary Examiner* — Chuen-Meei Gan
(74) *Attorney, Agent, or Firm* — Wenderoth, Lind & Ponack, L.L.P.

(57) ABSTRACT

A computer-implemented method is for designing a composite material in which reinforcement fiber base materials are laminated. The composite material includes a hole extending in a lamination direction of the reinforcement fiber base materials and a reinforcement part provided around the hole. The method includes calculating a strain value generated in the composite material based on design factors and a predetermined load condition, the design factors including a shape of the hole, a shape of the reinforcement part, and an orientation angle of each of the reinforcement fiber base materials in respective layers of the reinforcement part; and optimizing the design factors based on a genetic algorithm such that the calculated strain value tends to decrease.

4 Claims, 7 Drawing Sheets

(51) Int. Cl.
 *G06F 30/17* (2020.01)
 *G06F 113/26* (2020.01)

(56) References Cited

U.S. PATENT DOCUMENTS

| | | | |
|---|---|---|---|
| 2009/0022945 A1* | 1/2009 | Carpentier | G06F 30/3323 428/119 |
| 2010/0121625 A1* | 5/2010 | Krog | G06F 30/13 703/6 |

OTHER PUBLICATIONS

Bardy, J., X. Legrand, and A. Crosky. "Configuration of a genetic algorithm used to optimise fibre steering in composite laminates." Composite Structures 94, No. 6 (2012): 2048-2056. (Year: 2012).*

Marín, L., D. Trias, P. Badalló, G. Rus, and J. A. Mayugo. "Optimization of composite stiffened panels under mechanical and hygrothermal loads using neural networks and genetic algorithms." Composite structures 94, No. 11 (2012): 3321-3326. (Year: 2012).*

Todoroki, Akira, and Yuki Kawakami. "Structural design for CF/GF hybrid wind turbine blade using multi-objective genetic algorithm and kriging model response surface method." In AIAA Infotech@ Aerospace 2007 Conference and Exhibit, p. 2890. 2007. (Year: 2007).*

Huang, Jinhua, and R. T. Haftka. "Optimization of fiber orientations near a hole for increased load-carrying capacity of composite laminates." Structural and Multidisciplinary Optimization 30, No. 5 (2005): 335-341. (Year: 2005).*

Jegley, Dawn, Brian Tatting, and Zafer Gurdal. "Optimization of elastically tailored tow-placed plates with holes." In 44th AIAA/ASME/ASCE/AHS/ASC Structures, Structural Dynamics, and Materials Conference, p. 1420. 2003. (Year: 2003).*

* cited by examiner

METHOD FOR DESIGNING COMPOSITE MATERIAL AND COMPOSITE MATERIAL

CROSS-REFERENCE TO RELATED APPLICATIONS

The present application claims priority to and incorporates by reference the entire contents of Japanese Patent Application No. 2017-154631 filed in Japan on Aug. 9, 2017.

FIELD

The present invention relates to a method for designing a composite material and a composite material.

BACKGROUND

Conventionally, techniques are known for ensuring the strength and reducing the weight of a composite material provided by laminating reinforcement fiber base materials. For example, Patent Literature 1 discloses a method for designing a composite laminate containing steered-fiber plies defined by stream functions. This method is used to design the composite laminate satisfying target performance requirements by determining orientation angles of the steered-fiber plies associated with the stream functions using an optimization program.

CITATION LIST

Patent Literature

Patent Literature 1: Japanese Patent No. 5972062

SUMMARY

Technical Problem

In the case of forming a hole extending in the direction of the lamination in a composite material provided by laminating the reinforcement fiber base materials described in Patent Literature 1, a reinforcement part for increasing the thickness is sometimes provided around the hole to reduce a stress concentration at the rim of the hole. Providing the reinforcement part around the hole contributes to an increase in weight of the composite material. Thus, it is desired to both reduce the stress concentration generated at the rim of the hole and the reinforcement part and restrain the weight increase of the composite material.

The present invention has been made in view of the above problem, and it is an object thereof to provide a composite material provided by laminating reinforcement fiber base materials and having a hole and a reinforcement part provided around the hole, and to both reduce the stress concentration generated at the rim of the hole and the reinforcement part and restrain the weight increase of the composite material.

Solution to Problem

A computer-implemented method according to an aspect of the present invention is for designing a composite material in which reinforcement fiber base materials are laminated. The composite material includes a hole extending in a lamination direction of the reinforcement fiber base materials and a reinforcement part provided around the hole. The method includes calculating a strain value generated in the composite material based on design factors and a predetermined load condition, the design factors including a shape of the hole, a shape of the reinforcement part, and an orientation angle of each of the reinforcement fiber base materials in respective layers of the reinforcement part; and optimizing the design factors based on a genetic algorithm such that the calculated strain value tends to decrease.

With this configuration, all of the shape of the hole, the shape of the reinforcement part, and the orientation angle of each of the layers of the reinforcement part can be optimized such that the strain value generated in the composite material under the predetermined load condition tends to decrease. Consequently, structures of the reinforcement part and the hole can be obtained that can more appropriately reduce the strain value than a case of optimizing only the shape of the hole, a case of optimizing only the shape of the reinforcement part, and a case of optimizing only the orientation angle. As a result, since the stress concentration generated at the rim of the hole and the reinforcement part decreases, the reinforcement part can be restrained from increasing in size more than necessary. Accordingly, the present invention can both reduce the stress concentration generated at the rim of the hole and the reinforcement part and reduce the weight of the composite material.

The method may further include generating a piece of genetic information on the shape of the hole, a piece of genetic information on the shape of the reinforcement part, and a piece of genetic information on the orientation angle according to a predetermined limiting condition to generate a plurality of individuals having the different pieces of genetic information; calculating the strain value generated in the composite material under the predetermined load condition for each of the individuals; sequentially selecting at least two individuals having smaller strain values from among the individuals; genetically manipulating the pieces of genetic information using the selected individuals to newly generate individuals having the different genetic information; and calculating, when a predetermined condition is met while repeatedly performing the calculating the strain value and the genetically manipulating on the individuals generated at the genetically manipulating, an individual having a smaller strain value among the individuals as an optimal solution.

With this configuration, the processing of selectively genetically manipulating the individuals having the different genetic information is repeatedly performed in ascending order of the strain values, and thus, the efficient optimization can be achieved for all of the shape of the hole, the shape of the reinforcement part, and the orientation angle.

Each of the individuals may include the piece of genetic information on the shape of the hole, the piece of genetic information on the shape of the reinforcement part, and the piece of genetic information on the orientation angle. The method may further include calculating optimal solutions for the shape of the hole, the shape of the reinforcement part, and the orientation angle en masse.

With this configuration, the optimal solutions can be obtained that simultaneously optimize the shape of the hole, the shape of the reinforcement part, and the orientation angle. In particular, when the amount of information of each piece of the genetic information is small, the optimal solutions can be efficiently calculated.

Each of the individuals may be one of an individual for the piece of genetic information on the shape of the hole, an individual for the piece of genetic information on the shape of the reinforcement part, and an individual for the piece of genetic information on the orientation angle. The method may further include calculating optimal solutions in the order of the shape of the hole, the shape of the reinforcement part, and the orientation angle.

With this configuration, the optimal solution for the shape of the reinforcement part reflecting the optimal solution for the shape of the hole and the optimal solution for the orientation angle reflecting the optimal solutions for the shape of the hole and the shape of the reinforcement part can be obtained.

The shape of the hole may include a first hole defining point, a second hole defining point, and a third hole defining point in one quadrant in an X-Y coordinate system orthogonal to the lamination direction. The first hole defining point may be a preset coordinate point on a Y-axis. The second hole defining point may be a coordinate point neither on an X-axis nor on the Y-axis. The third hole defining point may be a coordinate point on the X-axis. The piece of genetic information on the shape of the hole may be information on an X-coordinate of the second hole defining point, a Y-coordinate of the second hole defining point, and an X-coordinate of the third hole defining point. The calculating the strain value may include interpolating the first hole defining point, the second hole defining point, and the third hole defining point to calculate the shape of the hole in the one quadrant for each of the individuals, and calculating the strain value based on the calculated shape.

With this configuration, since the optimal solution for the shape of the hole can be calculated using three variables of the X-coordinate of the second hole defining point, the Y-coordinate of the second hole defining point, and the X-coordinate of the third hole defining point, the computational load can be reduced.

A shape of an outermost layer of the reinforcement part may include a first reinforcement part defining point, a second reinforcement part defining point, and a third reinforcement part defining point in one quadrant in an X-Y coordinate system orthogonal to the lamination direction. The first reinforcement part defining point may be a preset coordinate point on a Y-axis. The second reinforcement part defining point may be a coordinate point neither on an X-axis nor on the Y-axis. The third reinforcement part defining point may be a coordinate point on the X-axis. The piece of genetic information on the shape of the reinforcement part may be information on an X-coordinate of the second reinforcement part defining point, a Y-coordinate of the second reinforcement part defining point, and an X-coordinate of the third reinforcement part defining point. The calculating the strain value may include interpolating the first reinforcement part defining point, the second reinforcement part defining point, and the third reinforcement part defining point to calculate the shape of the outermost layer of the reinforcement part in the one quadrant for each of the individuals, and calculating the strain value based on the calculated shape.

With this configuration, since the optimal solution for the shape of the reinforcement part can be calculated using three variables of the X-coordinate of the second reinforcement part defining point, the Y-coordinate of the second reinforcement part defining point, and the X-coordinate of the third reinforcement part defining point, the computational load can be reduced.

The piece of genetic information on the orientation angle may be capable of defining information indicating no laminated layer for each of the layers.

With this configuration, an optimal solution for the number of laminated layers of the reinforcement fiber base materials can also be obtained.

A composite material according to another aspect of the present invention includes reinforcement fiber base materials which are laminated. The composite material includes a hole extending in a lamination direction of the reinforcement fiber base materials; and a reinforcement part provided around the hole. The reinforcement part has a rhombus shape having apexes in a direction in which a uniaxial tensile load acts and in a direction orthogonal to the direction of the action thereof when the uniaxial tensile load acts on the composite material.

With this configuration, since the reinforcement part has the rhombus shape having the apexes in the direction of the action of the tensile load and in the direction orthogonal to the direction of the action thereof when the uniaxial tensile load is assumed to act on the composite material, the stress concentration generated at the rim of the hole and the reinforcement part can be reduced. Since the reinforcement part has the rhombus shape, the reinforcement part can be restrained from increasing in size more than necessary. Accordingly, the present invention can both reduce the stress concentration generated at the rim of the hole and the reinforcement part and reduce the weight of the composite material.

DESCRIPTION OF EMBODIMENTS

The following describes an embodiment of a method for designing a composite material and a composite material according to the present invention in detail based on the drawings. The present invention is not limited to the embodiment.

Figure 1:
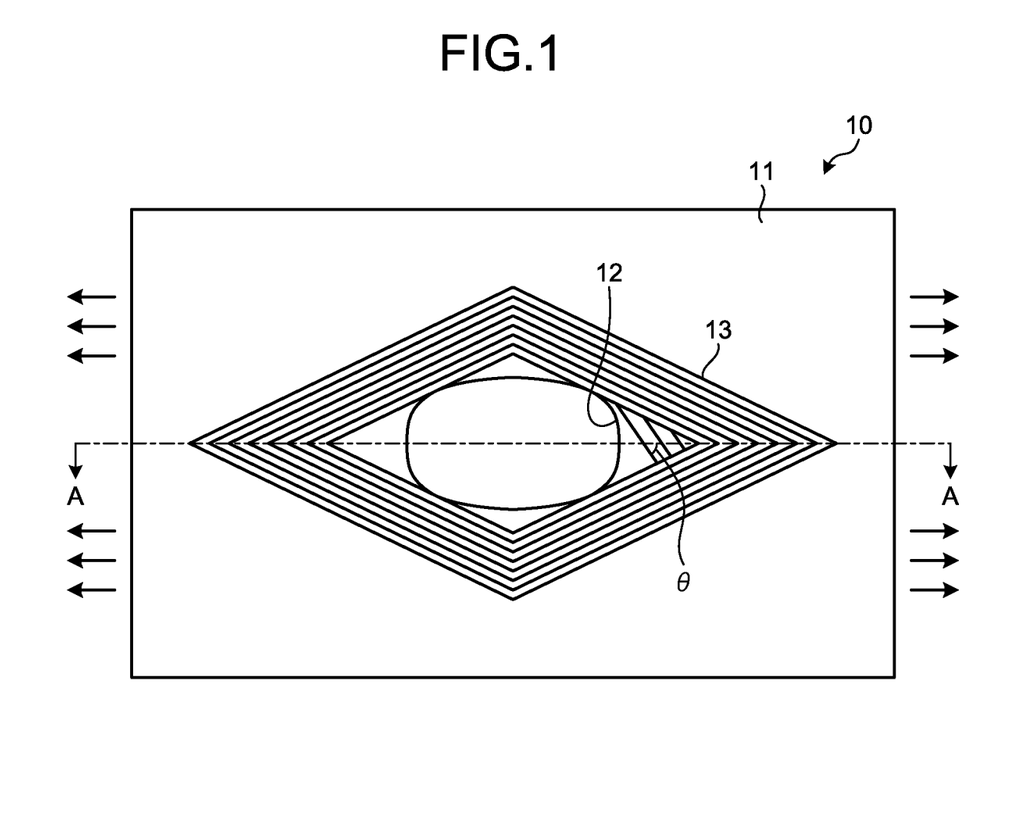
FIG. 1 is a plan view illustrating a composite material according to an embodiment of the present invention.
Figure 2:
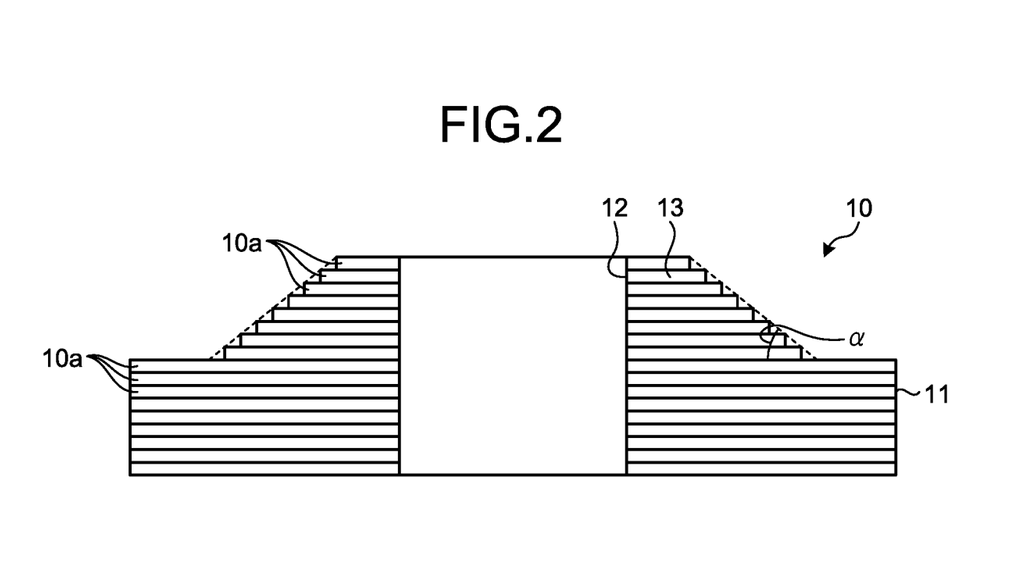
FIG. 2 is a sectional view taken along A-A line in FIG. 1.

FIG. 1 is a plan view illustrating the composite material according to the embodiment, and FIG. 2 is a sectional view taken along A-A line in FIG. 1. As illustrated in FIG. 1, a composite material 10 according to the present embodiment includes a base 11, a hole 12, and a reinforcement part 13. The composite material 10 is used at various portions of, for example, an aircraft. The composite material 10 can be applied, for example, to windows and piping holes provided in the fuselage of an aircraft, and to access holes (manholes) for work operations, piping holes, and fuel passage holes provided in the wings of the aircraft. The composite material 10 may be used in any structure other than the aircraft.

The base 11 is provided by laminating a plurality of reinforcement fiber base materials 10a. Each of the reinforcement fiber base materials 10a is made by impregnating a resin into reinforcement fibers. The hole 12 is a through-hole passing through the base 11 in the lamination direction of the reinforcement fiber base materials 10a (in the thickness direction of the composite material 10, i.e., in the up-down direction in FIG. 2). The reinforcement part 13 is provided on the base 11 around the hole 12. The reinforcement part 13 is provided by laminating the reinforcement fiber base materials 10a (eight layers, in the present embodiment). The hole 12 and the reinforcement part 13 have a symmetrical shape in the right-left direction in FIG. 1, and also have a symmetrical shape in the up-down direction in FIG. 1. The hole 12 has the same shape along the lamination direction of the reinforcement fiber base materials 10a. As illustrated in FIG. 2, the reinforcement part 13 changes in thickness at a predetermined gradient a from the outermost layer to the innermost layer.

Figure 3:
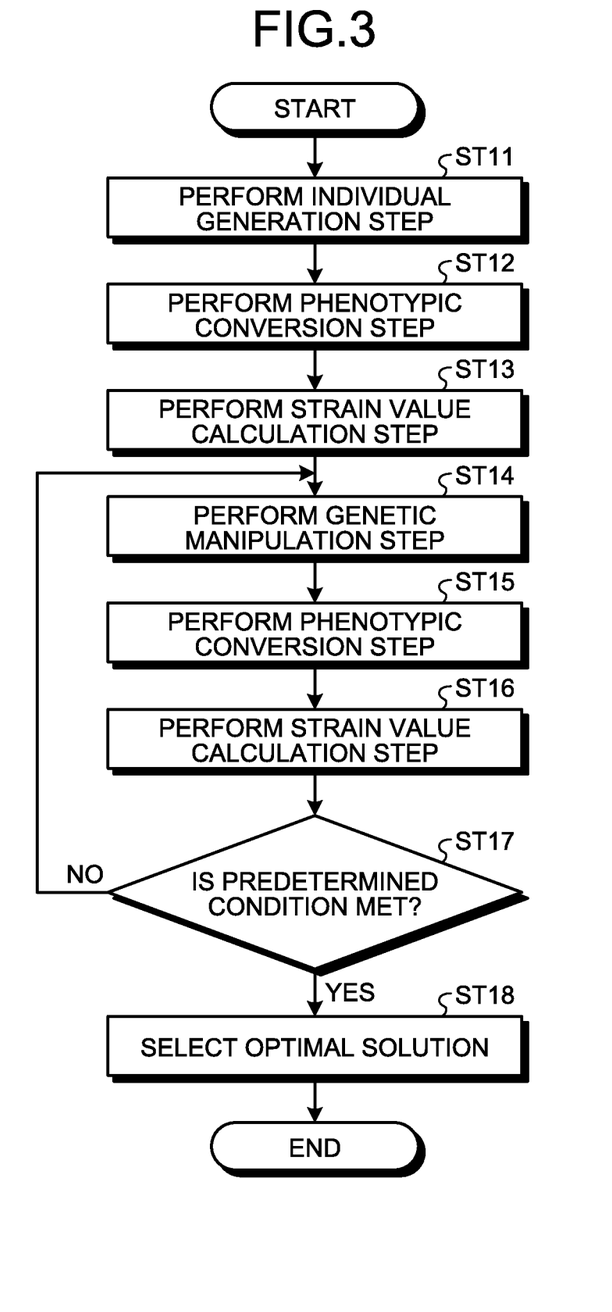
FIG. 3 is a flowchart illustrating a method according to the embodiment for designing the composite material.
Figure 4:
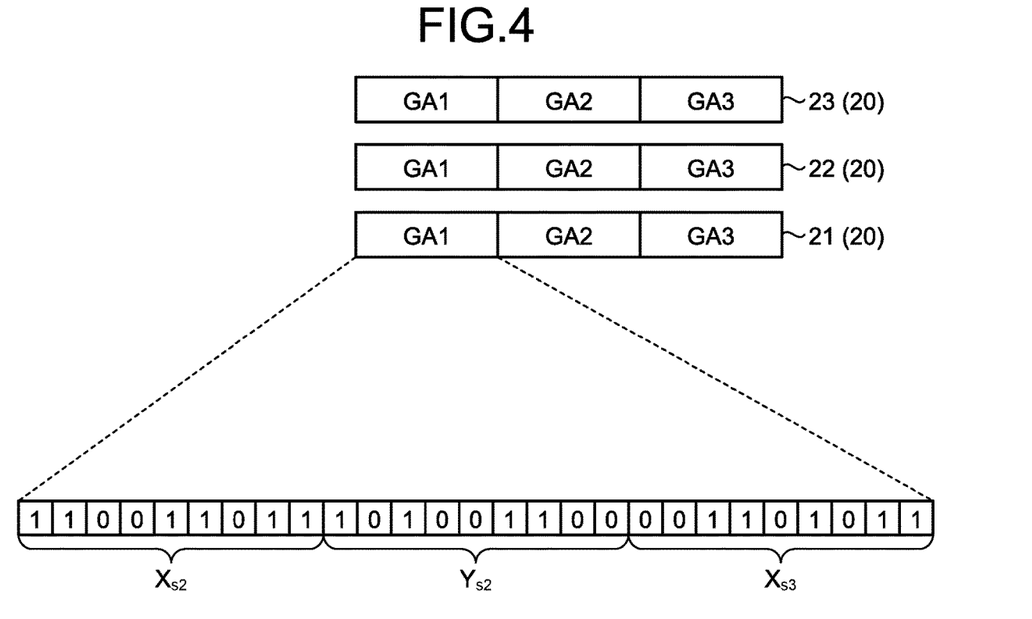
FIG. 4 is an explanatory diagram illustrating an example of individuals generated by processing in FIG. 3.

The following describes the method for designing the composite material 10 illustrated in FIGS. 1 and 2. The method according to the embodiment for designing the composite material is a method in which the shape of the hole 12, the shape of the reinforcement part 13, and an orientation angle θ of the reinforcement fiber base material 10a (angle of an array direction of the reinforcement fibers with respect to a predetermined reference direction (such as a direction along A-A line in FIG. 1) (at 0 degrees)) in each of the layers of the reinforcement part 13 are used as design factors, and a computer (not illustrated) is used to calculate a strain value generated in the composite material 10 based on the design factors and a predetermined load condition, and to optimize the design factors based on a genetic algorithm such that the calculated strain value tends to decrease. FIG. 3 is a flowchart illustrating an example of a procedure in the method according to the embodiment for designing the composite material, and FIG. 4 is an explanatory diagram illustrating an example of individuals generated by the processing in FIG. 3.

As illustrated in FIG. 3, the computer performs an individual generation step as Step ST11. The individual generation step is a step of generating a plurality of individuals 20 having genetic information GA1 on the shape of the hole 12, genetic information GA2 on the shape of the reinforcement part 13, and genetic information GA3 on the orientation angle θ of the reinforcement fiber base material 10a in each of the layers of the reinforcement part 13. In the present embodiment, as illustrated in FIG. 4, the computer generates three individuals 21, 22, and 23 having different pieces of the genetic information GA1, GA2, and GA3. Each of the individuals 21, 22, and 23 includes all pieces of the genetic information GA1, GA2, and GA3, as illustrated in FIG. 4. The computer generates the genetic information GA1, GA2, and GA3 according to predetermined limiting conditions and using random numbers. In the present embodiment, the genetic information GA1, GA2, and GA3 is defined in binary numbers within a range of a predetermined number of bits.

Figure 5:
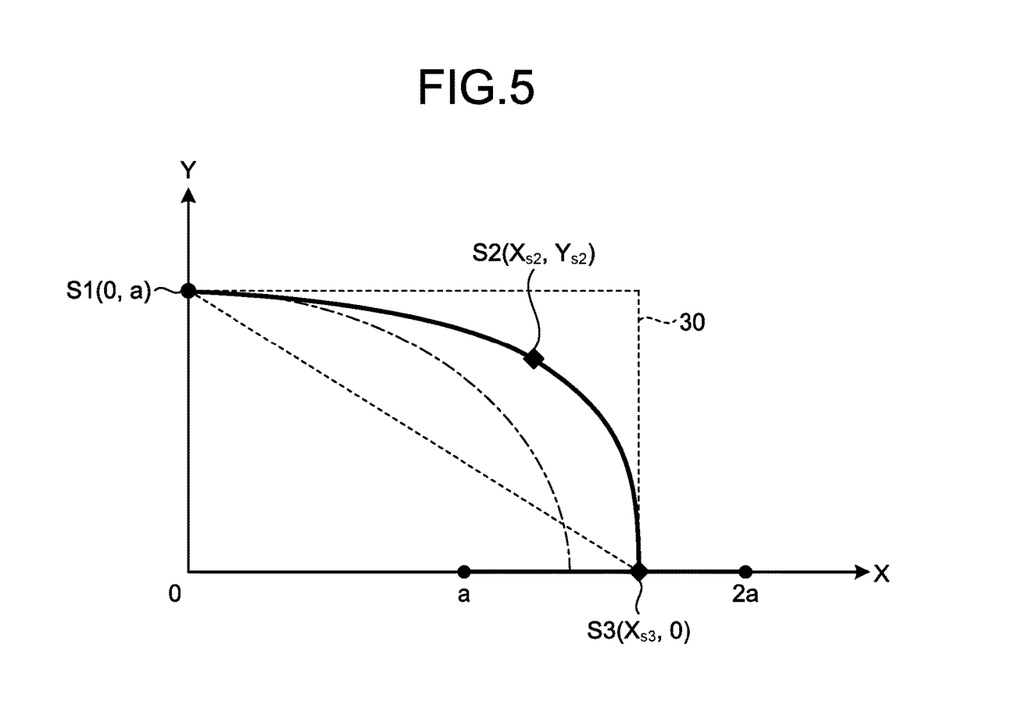
FIG. 5 is an explanatory diagram schematically illustrating a part of a shape of a hole calculated based on genetic information.

The following first describes the content of the genetic information GA1 on the shape of the hole 12 in conjunction with a part of the shape of the hole 12 calculated based on the genetic information GA1. FIG. 5 is an explanatory diagram schematically illustrating the part of the shape of the hole calculated based on the genetic information. As illustrated in FIG. 5, the part of the shape of the hole 12 includes a first hole defining point S1, a second hole defining point S2, and a third hole defining point S3 in one quadrant in the X-Y coordinate system orthogonal to the lamination direction of the reinforcement fiber base materials 10a. In the X-Y coordinate system illustrated in FIG. 5, the origin coincides with the center of the hole 12. A description will be given by exemplifying the shape of the hole 12 in the first quadrant.

The first hole defining point S1 is a coordinate point (0, a) on the X-axis. The second hole defining point S2 is a coordinate point $(X_{s2}, Y_{s2})$. The third hole defining point S3 is a coordinate point $(X_{s3}, 0)$ on the Y-axis. The Y-coordinate (a) of the first hole defining point S1 is a value preset by a user. The coordinate point $(X_{s2}, Y_{s2})$ of the second hole defining point S2 is included in a first predetermined range 30 indicated by a dotted line in FIG. 5. The first predetermined range 30 is a region other than those on the X-axis and the Y-axis. The first predetermined range 30 is preset by the user based on a required size of the hole 12. The X-coordinate $(X_{s3})$ of the third hole defining point S3 is a value in the range from a value a to a value 2a.

The shape of the hole 12 in the first quadrant can be calculated by interpolating the first hole defining point S1, the second hole defining point S2, and the third hole defining point S3. In the present embodiment, the computer uses spline interpolation to calculate the shape of the hole 12 in the first quadrant. Since the first hole defining point S1 is a preset constant, variables needed to calculate the shape of the hole 12 in the first quadrant are the X-coordinate $(X_{s2})$ of the second hole defining point S2, the Y-coordinate $(Y_{s2})$ of the second hole defining point S2, and the X-coordinate $(X_{s3})$ of the third hole defining point S3. According to a predetermined limiting condition and using random numbers, the computer generates the X-coordinate $(X_{s2})$ of the second hole defining point S2, the Y-coordinate $(Y_{s2})$ of the second hole defining point S2, and the X-coordinate $(X_{s3})$ of the third hole defining point S3 in binary numbers as the genetic information GA1 on the shape of the hole 12 for each of the individuals 21, 22, and 23. The predetermined limiting condition mentioned above is that the coordinates $(X_{s2}, Y_{s2})$ of the second hole defining point S2 shall be included in the first predetermined range 30, and the X-coordinate $(X_{s3})$ of the third hole defining point S3 shall be included in the range from the value a to the value 2a.

Figure 6:
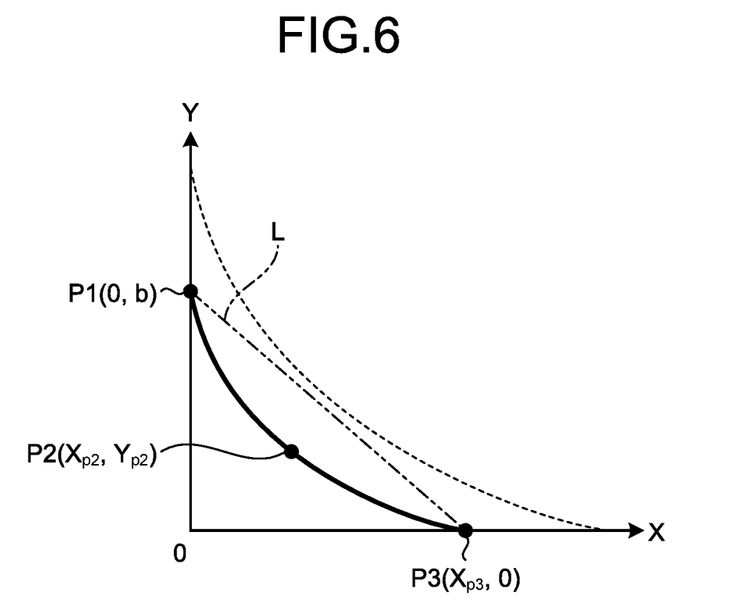
FIG. 6 is an explanatory diagram schematically illustrating a part of a shape of a reinforcement part calculated based on the genetic information.
Figure 7:
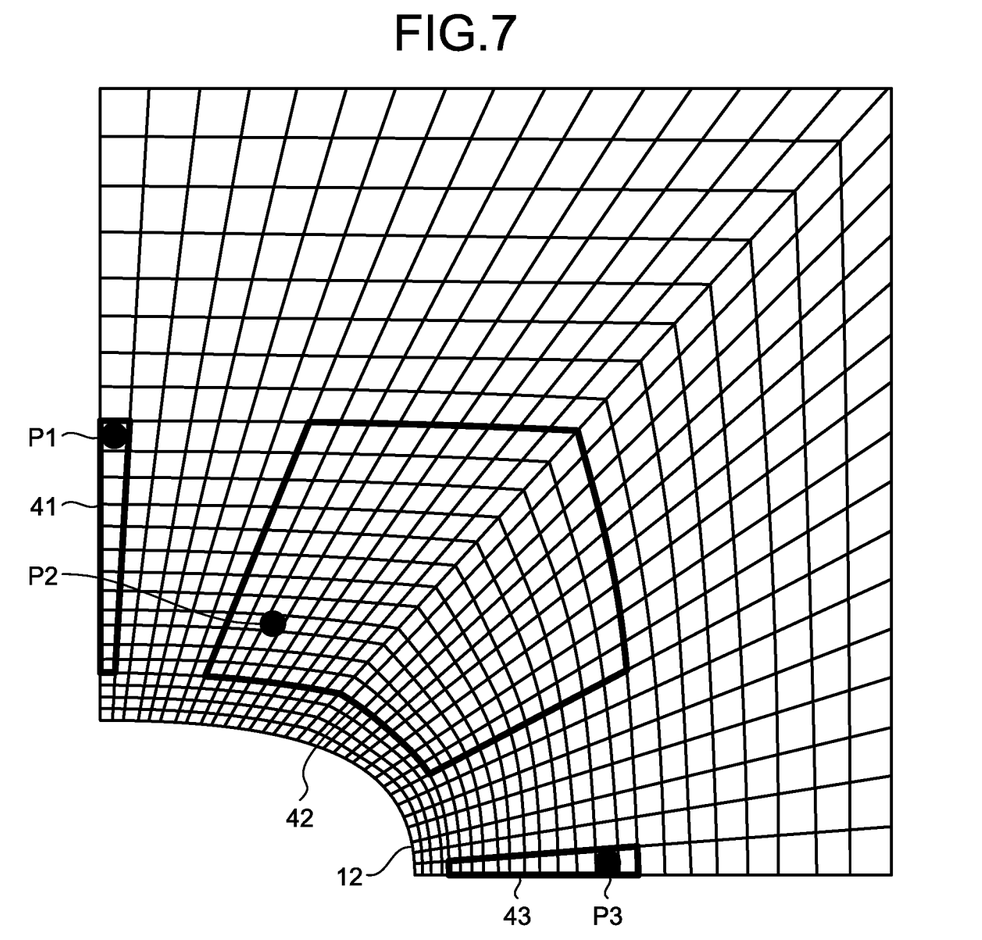
FIG. 7 is an explanatory diagram schematically illustrating a region for determining the genetic information on the shape of the reinforcement part.

The following describes the genetic information GA2 on the shape of the reinforcement part 13 in conjunction with a part of the shape of the outermost layer of the reinforcement part 13 calculated based on the genetic information GA2. FIG. 6 is an explanatory diagram schematically illustrating the part of the shape of the reinforcement part calculated based on the genetic information, and FIG. 7 is an explanatory diagram schematically illustrating a region for determining the genetic information on the shape of the reinforcement part. The genetic information GA2 on the shape of the reinforcement part 13 serves as variables for determining the shape of the outermost layer of the reinforcement part 13. As illustrated in FIG. 6, the shape of the outermost layer of the reinforcement part 13 calculated based on the genetic information GA2 includes a first reinforcement part defining point P1, a second reinforcement part defining point P2, and a third reinforcement part defining point P3 in one quadrant in the X-Y coordinate system orthogonal to the lamination direction of the reinforcement fiber base materials 10a. In the X-Y coordinate system illustrated in FIG. 6, the origin coincides with the centers of the hole 12 and the reinforcement part 13. A description will be given by exemplifying the part of the shape of the outermost layer of the reinforcement part 13 in the first quadrant.

The first reinforcement part defining point P1 is a coordinate point (0, b) on the X-axis. The second reinforcement part defining point P2 is a coordinate point $(X_{p2}, Y_{p2})$. The third reinforcement part defining point P3 is a coordinate point $(X_{p3}, 0)$ on the Y-axis. As illustrated in ranges surrounded by bold lines in FIG. 7, the first reinforcement part defining point P1 is included in a second predetermined range 41; the second reinforcement part defining point P2 is included in a second predetermined range 42; and the third reinforcement part defining point P3 is included in a second predetermined range 43. The second predetermined ranges 41, 42, and 43 are regions outside the shape of the hole 12 calculated based on the genetic information GA1. The second predetermined range 41 is preset by the user based on the Y-coordinate (a) of the first hole defining point S1 and an allowable size of the outermost layer of the reinforcement part 13. The Y-coordinate (b) of the first reinforcement part defining point P1 is preset by the user so as to be included in the second predetermined range 41. The second predetermined ranges 42 and 43 are set by the computer based on the shape of the hole 12 in the first quadrant calculated as described above and the allowable size of the outermost layer of the reinforcement part 13 preset by the user.

The shape of the outermost layer of the reinforcement part 13 in the first quadrant can be calculated by interpolating the first reinforcement part defining point P1, the second reinforcement part defining point P2, and the third reinforcement part defining point P3. In the present embodiment, the computer uses Lagrange interpolation to calculate the shape of the outermost layer of the reinforcement part 13 in the first quadrant. Since the first reinforcement part defining point P1 is a preset constant, variables needed to calculate the shape of the reinforcement part 13 in the first quadrant are the coordinates $(X_{p2}, Y_{p2})$ of the second reinforcement part defining point P2 and the X-coordinate $(X_{p3})$ of the third reinforcement part defining point P3. According to a predetermined limiting condition and using random numbers, the computer generates the coordinates $(X_{p2}, Y_{p2})$ of the second reinforcement part defining point P2 and the X-coordinate $(X_{p3})$ of the third reinforcement part defining point P3 in binary numbers as the genetic information GA2 on the shape of the reinforcement part 13 for each of the individuals 21, 22, and 23. The predetermined limiting condition mentioned above is that the coordinates $(X_{p2}, Y_{p2})$ of the second reinforcement part defining point P2 shall be included in the second predetermined range 42 and the X-coordinate $(X_{p3})$ of the third reinforcement part defining point P3 shall be included in the second predetermined range 43.

The following describes the genetic information GA3 on the orientation angle θ in each of the layers of the reinforcement part 13. The computer generates the orientation angle θ in each of the layers of the reinforcement part 13 according to a predetermined limiting condition and using random numbers. The predetermined limiting condition in the case of generating the genetic information GA3 on the orientation angle θ is that the orientation angle θ shall be set to be a multiple of a predetermined angle (such as 15 degrees). In the present embodiment, the number of layers of the reinforcement fiber base materials 10a in the reinforcement part 13 is preset by the user.

Referring back to the description of FIG. 3, the computer performs, as Step ST12, a phenotypic conversion step of converting the genetic information GA1, GA2, and GA3 for each of the individuals 21, 22, and 23 generated at Step ST11 into phenotypes. The expression "converting into phenotypes" refers herein to converting the genetic information GA1, GA2, and GA3 defined in binary numbers into decimal number values. For example, the X-coordinate $(X_{s2})$ of the second hole defining point S2 included in the genetic information GA1 on the individual 21 illustrated in FIG. 4 can be converted into a decimal number value of 411 according to Calculation (1) below. As represented by Calculation (2), the value of 411 obtained by Calculation (1) can be normalized with respect to a value of 1 as the maximum value by being divided by a value of 511 serving as the maximum value representable by the total number of bits (nine bits in the example illustrated in FIG. 4). A value of 0.804 obtained by Calculation (2) represents the coordinate point of the second hole defining point S2. The computer uses the same method to convert all the binary number values included in the genetic information GA1, GA2, and GA3 into decimal numbers.

$$(2^8 \cdot 1)+(2^7 \cdot 1)+(2^6 \cdot 0)+(2^5 \cdot 0)+(2^4 \cdot 1)+(2^3 \cdot 1)+(2^2 \cdot 0)+ (2^1 \cdot 1)+(2^0 \cdot 1)=411 \tag{1}$$

$$411/511=0.804 \tag{2}$$

The computer subsequently performs a strain value calculation step as Step ST13, as illustrated in FIG. 3. The strain value calculation step is a step of calculating the strain value generated in the composite material 10 under the predetermined load condition for each of the individuals 21, 22, and 23 on which the genetic information GA1, GA2, and GA3 has been converted into the phenotypes. More in detail, the computer applies the spline interpolation to the first hole defining point S1, the second hole defining point S2, and the third hole defining point S3 for each of the individuals 21, 22, and 23, and thus calculates the shape of the hole 12 in the first quadrant illustrated with a solid line in FIG. 5. The computer extends the calculated shape of the hole 12 in the first quadrant to the second to fourth quadrants in a corresponding manner, and thus calculates the entire shape of the hole 12.

The computer applies the Lagrange interpolation to the first reinforcement part defining point P1, the second reinforcement part defining point P2, and the third reinforcement part defining point P3 for each of the individuals 21, 22, and 23, and thus calculates the shape of the outermost layer of the reinforcement part 13 in the first quadrant illustrated with a solid line in FIG. 6. The computer calculates the shape of the reinforcement part 13 in the first quadrant based on the calculated shape of the outermost layer of the reinforcement part 13 in the first quadrant. Specifically, according to the predetermined gradient a (refer to FIG. 1) set in advance and the thickness of each of the layers of the reinforcement fiber base materials 10a, the computer expands the shape of the outermost layer of the reinforcement part 13 outward to calculate the shape of the reinforcement part 13 in the first quadrant, as illustrated with a dashed line in FIG. 6. Furthermore, the computer extends the calculated shape of the reinforcement part 13 in the first quadrant to the second to fourth quadrants in a corresponding manner, and thus calculates the entire shape of the reinforcement part 13.

The computer calculates the orientation angle θ of the reinforcement fiber base material 10a in each of the layers of the reinforcement part 13 based on the genetic information GA3 for each of the individuals 21, 22, and 23. Thus, the shape of the hole 12, the shape of the reinforcement part 13, and the value of the orientation angle θ of the reinforcement fiber base material 10a in each of the layers of the reinforcement part 13 are determined for every one of the individuals 21, 22, and 23.

The computer performs analysis to calculate the strain value generated in the composite material 10 under the predetermined load condition for each of the individuals 21, 22, and 23 for which the shape of the hole 12, the shape of the reinforcement part 13, and the value of the orientation angle θ of the reinforcement fiber base material 10a in each of the layers of the reinforcement part 13 have been determined. More in detail, the computer uses an analysis method, such as a finite element method, to calculate the strain value generated at the rim of the hole 12 and the reinforcement part 13 when a uniaxial tensile load acts on the composite material 10 as indicated by solid-line arrows in FIG. 1. The "strain value" may be the maximum value or the average value of strain values generated at the rim of the hole 12 and the reinforcement part 13, or may be a strain value generated at a certain place.

The computer subsequently performs a genetic manipulation step, as Step ST14. The genetic manipulation step is a step of selecting two of the individuals 21, 22, and 23 having smaller strain values and genetically manipulating the genetic information GA1, GA2, and GA3 to newly generate a plurality of individuals having the different genetic information GA1, GA2, and GA3. For example, if strain values of the individuals 21 and 22 illustrated in FIG. 4 are smaller than the strain value of the individual 23, the computer genetically manipulates the genetic information GA1, GA2, and GA3 included in the individuals 21 and 22.

Figure 8:
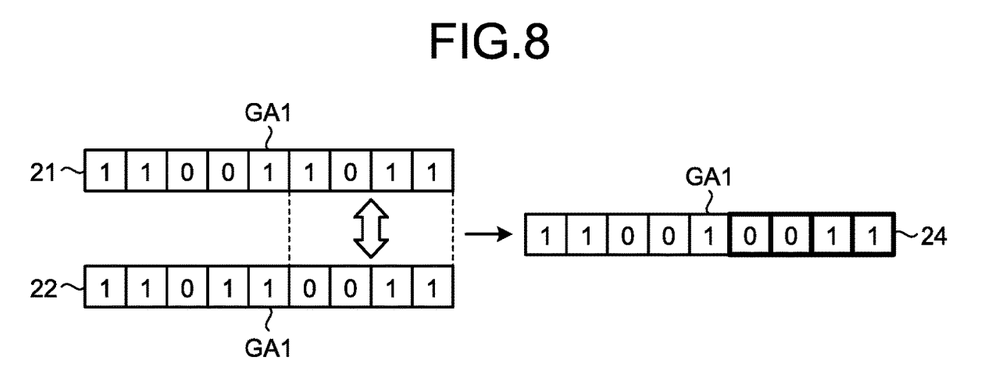
FIG. 8 is an explanatory diagram illustrating a specific example of a genetic manipulation.
Figure 9:
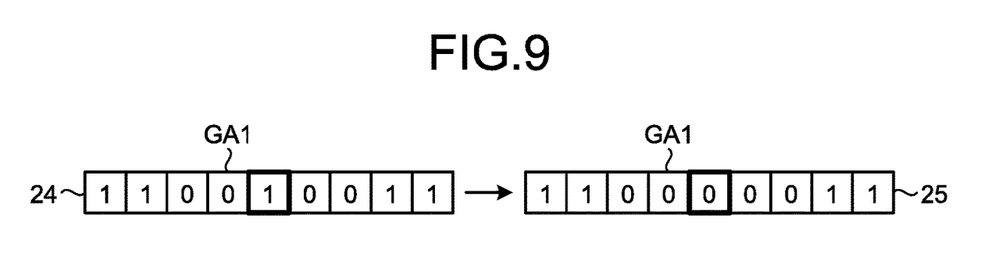
FIG. 9 is an explanatory diagram illustrating the specific example of the genetic manipulation.

FIGS. 8 and 9 are explanatory diagrams illustrating a specific example of the genetic manipulation. FIGS. 8 and 9 illustrate a case of genetically manipulating the information on the X-coordinate ($X_{s2}$) of the second hole defining point S2 in the genetic information GA1. The computer separates the genetic information GA1 included in the individuals 21 and 22 at any location as indicated by a dashed line in FIG. 8, and performs crossover processing of swapping the values of the two pieces of genetic information at the separated location, as indicated by an outline arrow. This processing generates an individual 24 including the new genetic information GA1 obtained by crossover of parts of the genetic information GA1, as illustrated in ranges surrounded by bold lines in FIG. 8. FIG. 8 illustrates only the example in which the crossover processing is performed on the information on the X-coordinate ($X_{s2}$) of the second hole defining point S2 in the genetic information GA1. However, the computer performs the crossover processing in the same manner on all pieces of the genetic information GA1, GA2, and GA3 included in the individuals 21 and 22 to generate the new individual 24. When the crossover processing is performed, the genetic information GA1, GA2, and GA3 may be separated at any location. The crossover processing may be performed between pieces of information corresponding to each other between the individuals 21 and 22 (such as between pieces of information on the X-coordinate ($X_{s2}$) of the second hole defining point S2), or may be performed by separating all pieces of information included in the genetic information GA1, GA2, and GA3 at any location.

The computer performs mutation processing of inverting the value of a part of the genetic information GA1 on the new individual 24 to generate a new individual 25 having the new genetic information GA1, as illustrated in ranges surrounded by bold lines in FIG. 9. FIG. 9 illustrates only the example in which the mutation processing is performed on the information on the X-coordinate ($X_{s2}$) of the second hole defining point S2 in the genetic information GA1. However, the mutation processing may be performed at any location of the genetic information GA1, GA2, and GA3 included in the individuals 21 and 22. The computer performs the genetic manipulation processing illustrated in FIGS. 8 and 9 a plurality of times (such as three times) to generate a plurality of (for example, three) such new individuals 25 having the different genetic information GA1, GA2, and GA3.

As illustrated in FIG. 3, the computer subsequently uses the individuals 25 newly generated at Step ST14 to perform again the phenotypic conversion step and the strain value calculation step described above, as Step ST15 and Step ST16. Through this processing, the computer calculates the strain value generated in the composite material 10 for each of the individuals 25 newly generated at Step ST14.

As illustrated in FIG. 3, the computer subsequently determines whether a predetermined condition is met, as Step ST17, and, when the predetermined condition is determined to be not met (No at Step ST17), repeats the processing from Step ST14 to Step ST16. In the present embodiment, the expression "a predetermined condition is met" refers to a condition that the number of times of the repeated processing from Step ST14 to Step ST16 has reached a preset upper limit number of times. The "preset upper limit number of times" is set by the user as the number of times until the strain value of each of the individuals 25 calculated at Step ST16 is sufficiently converged by the repeated processing from Step ST14 to Step ST16. The expression "a predetermined condition is met" may refer to a condition that the rate of change in the strain value of each of the individuals 25 calculated at Step ST16 has reached a value equal to or lower than a threshold preset by the user. The expression "a predetermined condition is met" may also refer to a condition that the minimum value or the average value of the strain values of the respective individuals 25 calculated at Step ST16 has become equal to or lower than a value preset by the user.

When the predetermined condition is determined to be met at Step ST17 (Yes at Step ST17), the computer selects, as an optimal solution, an individual having the smallest strain value from among the individuals 25, as Step ST18, and ends this routine. The computer may sequentially select, as optimal solutions, a plurality of individuals having smaller strain values from among the individuals 25.

As a result, optimal solutions can be obtained for the shape of the hole 12, the shape of the reinforcement part 13, and the orientation angle θ of the reinforcement fiber base material 10a in each of the layers of the reinforcement part 13 that serve as the design factors, and the composite material 10 illustrated as an example in FIGS. 1 and 2 can be manufactured based on the optimal solutions. In the composite material 10 manufactured based on the optimal solutions, as an example, the hole 12 has a shape expanded outward from an elliptical shape (refer to a long dashed short dashed line in FIG. 5). The inventors of the present invention have obtained an analytical result and an experimental result that, when the uniaxial tensile load acts on the composite material 10, the strain value generated at the rim of the hole 12 can be made smaller than in the case where the hole 12 has the elliptical shape.

In the composite material 10 manufactured based on the optimal solutions, as an example, the reinforcement part 13 has a rhombus shape. The reinforcement part 13 has apexes in the direction of the action of the tensile load and in the direction orthogonal to the direction of the action of the tensile load when the uniaxial tensile load acts on the composite material 10. According to the optimal solution for the reinforcement part 13 calculated by the method according to the present embodiment for designing the composite material, the shape of the outermost layer is a curved shape connecting together the first reinforcement part defining point P1, the second reinforcement part defining point P2, and the third reinforcement part defining point P3. According to the optimal solution for the reinforcement part 13, as an example, the second reinforcement part defining point P2 is located near a straight line L (substantially on the straight line L) (refer to a long dashed double-short dashed line in FIG. 6) connecting the first reinforcement part defining point P1 to the third reinforcement part defining point P3. In the reinforcement part 13 of the composite material 10 manufactured based on the optimal solutions, the outermost layer has a shape along the straight line L, and shapes of the other layers are also rhombus shapes formed by expanding the straight line L outward.

In the composite material 10 manufactured based on the optimal solutions, as an example, the orientation angle θ in each of the layers of the reinforcement part 13 is set to 0 degrees, 30 degrees, 0 degrees, 15 degrees, −15 degrees, −30 degrees, −15 degrees, and 45 degrees from the innermost layer to the outermost layer.

Figure 10:
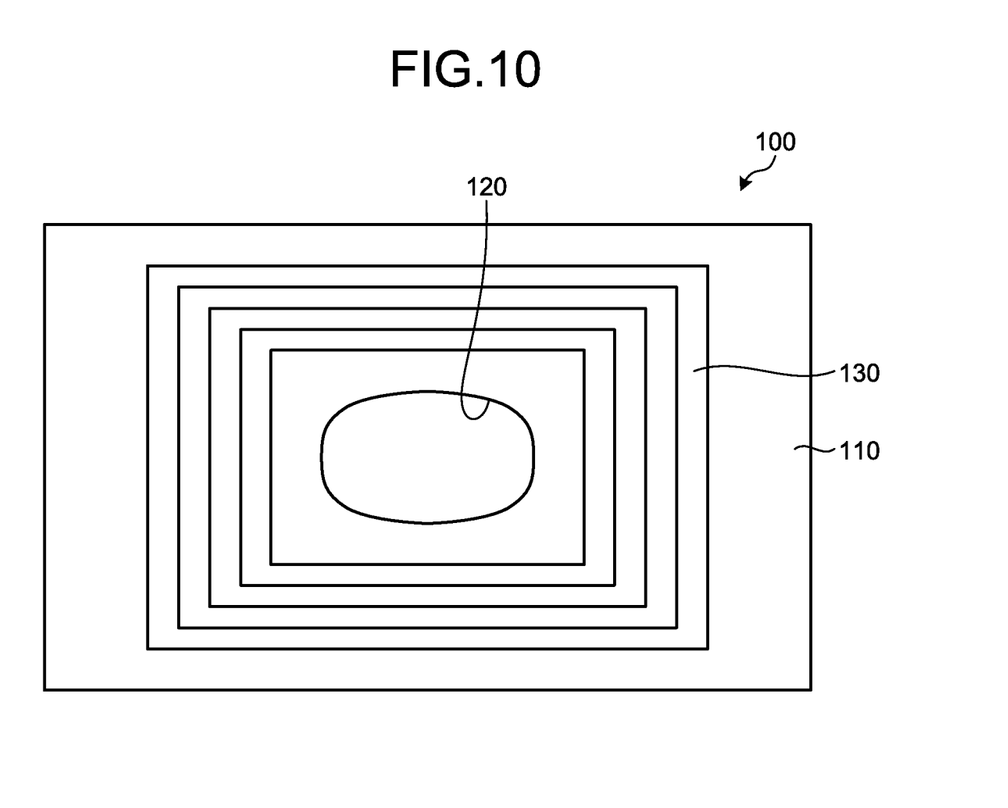
FIG. 10 is a plan view illustrating a composite material as a comparative example.

FIG. 10 is a plan view illustrating a composite material as a comparative example. A composite material 100 as the comparative example includes a hole 120 passing through a base 110 and a reinforcement part 130 provided around the hole 120. In the composite material 100 of the comparative example, the hole 120 has the same shape as that of the hole 12 of the composite material 10, whereas the reinforcement part 130 has a commonly employed rectangular shape. In the composite material 100 as the comparative example, the reinforcement part 130 has a four-layer configuration, and the orientation angle θ in each of the layers is set to 45 degrees, 0 degrees, 45 degrees, and 90 degrees from the innermost layer to the outermost layer. The inventors of the present invention have obtained an analytical result that, when the uniaxial tensile load acts on the composite material 10, the strain value generated at the hole 12 and the reinforcement part 13 can be made substantially equal to that of the composite material 100 as the comparative example. In other words, a stress concentration generated at the rim of the hole 12 and the reinforcement part 13 can be reduced. Meanwhile, since the reinforcement part 13 of the composite material 10 has the rhombus shape, the reinforcement part 13 can be restrained from increasing in size more than necessary, and thus, the reinforcement part 13 can be more greatly reduced in weight than the rectangular reinforcement part 130.

As described above, the method according to the embodiment for designing the composite material is the method for designing the composite material that uses the computer to design the composite material 10 provided by laminating the reinforcement fiber base materials 10a, in which the composite material 10 includes the hole 12 extending in the lamination direction of the reinforcement fiber base materials 10a and the reinforcement part 13 provided around the hole 12, and the computer uses, as the design factors, the shape of the hole 12, the shape of the reinforcement part 13, and the orientation angle θ of each of the reinforcement fiber base materials 10a in the respective layers of the reinforcement part 13, calculates the strain value generated in the composite material 10 based on the design factors and the predetermined load condition, and optimizes the design factors based on the genetic algorithm such that the calculated strain value tends to decrease.

With this configuration, all of the shape of the hole 12, the shape of the reinforcement part 13, and the orientation angle θ of each of the layers of the reinforcement part 13 can be optimized such that the strain value generated in the composite material 10 under the predetermined load condition tends to decrease. Consequently, structures of the hole 12 and the reinforcement part 13 can be obtained that can more appropriately reduce the strain value than a case of optimizing only the shape of the hole 12, a case of optimizing only the shape of the reinforcement part 13, and a case of optimizing only the orientation angle θ. As a result, since the stress concentration generated at the rim of the hole 12 and the reinforcement part 13 decreases, the reinforcement part 13 can be restrained from increasing in size more than necessary. Accordingly, the method according to the embodiment for designing the composite material can both reduce the stress concentration generated at the rim of the hole 12 and the reinforcement part 13 and reduce the weight of the composite material 10.

The method according to the present embodiment for designing the composite material can optimize the structures of the hole 12 and the reinforcement part 13 including the orientation angle θ in each of the layers of the reinforcement part 13. Therefore, by varying the predetermined limiting condition that the orientation angle θ in each of the layers shall be set to be a multiple of the predetermined angle, the more optimal solution for the orientation angle θ can be obtained while providing a higher degree of freedom of design of the orientation angle θ than a case where the predetermined angle is limited to, for example, 45 degrees, which has been a conventional practice.

The method according to the present embodiment for designing the composite material includes the individual generation step (Step ST11) at which the computer generates the genetic information GA1 on the shape of the hole 12, the genetic information GA2 on the shape of the reinforcement part 13, and the genetic information GA3 on the orientation angle θ, and generates the individuals 20 having the different genetic information GA1, GA2, and GA3 according to the predetermined limiting condition; the strain value calculation step (Step ST13) at which the computer calculates the strain value generated in the composite material 10 under the predetermined load condition for each of the individuals 20; and the genetic manipulation step (Step ST14) at which the computer sequentially selects the two individuals having the smaller strain values from among the individuals 20, and genetically manipulates the genetic information GA1, GA2, and GA3 using the selected individuals 20 to newly generate the individuals 25 having the different genetic information GA1, GA2, and GA3. In the method, the computer repeatedly performs the strain value calculation step (Step ST16) and the genetic manipulation step (Step ST14) using the individuals 25 generated at the genetic manipulation step, and, when the predetermined condition is met, calculates the individuals having the smaller strain values among the individuals 25, as the optimal solutions.

With this configuration, the processing of selectively genetically manipulating the individuals 20 and 25 having the different genetic information GA1, GA2, and GA3 is repeatedly performed in ascending order of the strain value, and thus, the efficient optimization can be achieved for all of the shape of the hole 12, the shape of the reinforcement part 13, and the orientation angle θ.

Each of the individuals 20 includes all of the genetic information GA1 on the shape of the hole 12, the genetic information GA2 on the shape of the reinforcement part 13, and the genetic information GA3 on the orientation angle θ, and the computer calculates the optimal solutions for the shape of the hole 12, the shape of the reinforcement part 13, and the orientation angle θ en masse.

With this configuration, the optimal solutions can be obtained that simultaneously optimize the shape of the hole 12, the shape of the reinforcement part 13, and the orientation angle θ. In particular, when the amount of information of each piece of the genetic information GA1, GA2, and GA3 is small, the optimal solutions can be efficiently calculated.

The shape of the hole 12 includes the first hole defining point S1, the second hole defining point S2, and the third hole defining point S3 in one quadrant in the X-Y coordinate system orthogonal to the lamination direction; the first hole defining point S1 is the preset coordinate point (0, a) on the Y-axis; the second hole defining point S2 is the coordinate point $(X_{s2}, Y_{s2})$ neither on the X-axis nor on the Y-axis; the third hole defining point S3 is the coordinate point $(X_{s3}, 0)$ on the X-axis; the genetic information GA1 on the shape of the hole 12 is the information on the X-coordinate $(X_{s2})$ of the second hole defining point S2, the Y-coordinate $(Y_{s2})$ of the second hole defining point S2, and the X-coordinate $(X_{s3})$ of the third hole defining point S3; and, at the strain value calculation step (each of Steps ST13 and ST16), the computer interpolates the first hole defining point S1, the second hole defining point S2, and the third hole defining point S3 to calculate the shape of the hole 12 in the one quadrant for each of the individuals 20 and 25, and, based on this calculation result, calculates the strain value.

With this configuration, since the optimal solution for the shape of the hole 12 can be calculated using the three variables of the X-coordinate $(X_{s2})$ of the second hole defining point S2, the Y-coordinate $(Y_{s2})$ of the second hole defining point S2, and the X-coordinate $(X_{s3})$ of the third hole defining point S3, the computational load can be reduced.

The shape of the outermost layer of the reinforcement part 13 includes the first reinforcement part defining point P1, the second reinforcement part defining point P2, and the third reinforcement part defining point P3 in one quadrant in the X-Y coordinate system orthogonal to the lamination direction; the first reinforcement part defining point P1 is the preset coordinate point (0, b) on the Y-axis; the second reinforcement part defining point P2 is the coordinate point $(X_{p2}, Y_{p2})$ neither on the X-axis nor on the Y-axis; the third reinforcement part defining point P3 is the coordinate point $(X_{p3}, 0)$ on the X-axis; the genetic information GA3 on the shape of the reinforcement part 13 is the information on the X-coordinate $(X_{p2})$ of the second reinforcement part defining point P2, the Y-coordinate $(Y_{p2})$ of the second reinforcement part defining point P2, and the X-coordinate $(X_{p3})$ of the third reinforcement part defining point P3; and, at the strain value calculation step (each of Steps ST13 and ST16), the computer interpolates the first reinforcement part defining point P1, the second reinforcement part defining point P2, and the third reinforcement part defining point P3 to calculate the shape of the outermost layer of the reinforcement part 13 in the one quadrant for each of the individuals 20 and 25, and, based on this calculation result, calculates the strain value.

With this configuration, since the optimal solution for the shape of the reinforcement part 13 can be calculated using the three variables of the X-coordinate $(X_{p2})$ of the second reinforcement part defining point P2, the Y-coordinate $(Y_{p2})$ of the second reinforcement part defining point P2, and the X-coordinate $(X_{p3})$ of the third reinforcement part defining point P3, the computational load can be reduced.

In the present embodiment, the description has been made that, at the genetic manipulation step (Step ST14), the two of the individuals 20 and 25 having the smaller strain values are selected, and the genetic information GA1, GA2, and GA3 is genetically manipulated using the selected two of the individuals 20 and 25. However, three or more of the individuals 20 and 25 having smaller strain values may be selected, and the genetic information GA1, GA2, and GA3 may be genetically manipulated using the selected three or more of the individuals 20 and 25.

In the present embodiment, the description has been made that the strain value calculation step (Step ST16) and the genetic manipulation step (Step ST14) are repeatedly performed using the individuals 25 generated by performing the crossover processing and the mutation processing as the genetic manipulation processing. However, the strain value calculation step (Step ST16) and the genetic manipulation step (Step ST14) may be repeatedly performed using the individuals 24 generated by performing the crossover processing without performing the mutation processing. The genetic manipulation processing is not limited to that exemplified in the present embodiment. Any genetic manipulation processing used in general genetic algorithms may be used.

In the present embodiment, the description has been made that each of the individuals 20, 24, and 25 includes all of the genetic information GA1, the genetic information GA2, and the genetic information GA3, and the computer calculates the optimal solutions for the shape of the hole 12, the shape of the reinforcement part 13, and the orientation angle θ en masse. However, the calculation procedure of the optimal solutions is not limited thereto. That is, each of the individuals 20, 24, and 25 may be divided into a portion including the genetic information GA1 on the shape of the hole 12, a portion including the genetic information GA2 on the shape of the reinforcement part 13, and a portion including the genetic information GA3 on the orientation angle θ.

In this case, the computer first optimizes only the genetic information GA1 on the shape of the hole 12 using the processing of the genetic algorithm illustrated in FIG. 4. At this time, the computer only needs to calculate the strain value for each of the individuals at the strain value calculation step (each of Steps ST13 and ST16) on the assumption that the reinforcement part 13 formed in any shape at any orientation angle θ is present around the hole 12. The computer subsequently optimizes the genetic information GA2 on the shape of the reinforcement part 13 using the processing of the genetic algorithm illustrated in FIG. 4. At this time, the computer only needs to set the second predetermined ranges 42 and 43 based on the optimized shape of the hole 12 and the allowable size of the outermost layer of the reinforcement part 13 preset by the user, at the individual generation step (Step ST11). The computer also only needs to set the orientation angle θ in each of the layers of the reinforcement part 13 to any value and calculate the strain value for each of the individuals at the strain value calculation step (each of Steps ST13 and ST16). The computer subsequently optimizes the genetic information GA3 on the orientation angle θ in each of the layers of the reinforcement part 13 using the processing of the genetic algorithm illustrated in FIG. 4. The computer may calculate the optimal solutions in the order of the shape of the hole 12, the shape of the reinforcement part 13, and the orientation angle θ, in this manner. With this configuration, the optimal solution for the shape of the reinforcement part 13 reflecting the optimal solution for the shape of the hole 12 and the optimal solution for the orientation angle θ reflecting the optimal solutions for the shape of the hole 12 and the shape of the reinforcement part 13 can be obtained. The orientation angle θ may be optimized after the shape of the hole 12 and the shape of the reinforcement part 13 are optimized en masse, or the shape of the reinforcement part 13 and the orientation angle θ may be optimized en masse after the shape of the hole 12 is optimized.

In the present embodiment, the description has been made that the user presets the number of the laminated layers of the reinforcement fiber base materials 10a in the reinforcement part 13. The number of the laminated layers of the reinforcement fiber base materials 10a in the reinforcement part 13 may also be optimized by the genetic algorithm. Specifically, in the genetic information GA3 on the orientation angle θ of each of the layers, information indicating "no laminated layer" can be defined for each of the layers. At the genetic manipulation step (Step ST14) in FIG. 3, the computer performs the genetic manipulation such that the information on the orientation angle θ in a certain layer indicates "no laminated layer", for example, when performing the mutation processing. As a result, the number of the laminated layers of the reinforcement fiber base materials 10a can also be optimized. In this case, the user preferably presets a lower limit value of the number of the laminated layers so as to prevent the genetic manipulation from resulting in the number of the laminated layers being smaller than the lower limit value. Since the shape of the reinforcement part 13 is determined based on the number of the laminated layers of the reinforcement fiber base materials 10a (thickness of the reinforcement part 13), any change in the number of the laminated layers of the reinforcement fiber base materials 10a needs to be performed before the shape of the reinforcement part 13 is optimized. Accordingly, the optimization of the number of the laminated layers of the reinforcement fiber base materials 10a can be applied only in the case of using the method in which the computer calculates the optimal solutions for the shape of the reinforcement part 13 and the orientation angle θ en masse.

In the present embodiment, the description has been made that the hole 12 and the reinforcement part 13 have a symmetrical shape in the right-left direction in FIG. 1, and also have a symmetrical shape in the up-down direction in FIG. 1. The hole 12 and the reinforcement part 13 may, however, have a symmetrical shape in the right-left direction alone in FIG. 1. In other words, the hole 12 and the reinforcement part 13 may be constituted by the upper half alone or the lower half alone of the shape illustrated in FIG. 1.

REFERENCE SIGNS LIST

10 Composite material
10a Reinforcement fiber base material
11 Base
12 Hole
13 Reinforcement part
20, 21, 22, 23, 24, and 25 Individuals
30 First predetermined range
41, 42, and 43 Second predetermined ranges
100 Composite material
120 Hole
130 Reinforcement part
GA1, GA2, GA3 Genetic information
P1 First reinforcement part defining point
P2 Second reinforcement part defining point
P3 Third reinforcement part defining point
S1 First hole defining point
S2 Second hole defining point
S3 Third hole defining point
α Gradient
θ Orientation angle

The invention claimed is:

1. A computer-implemented method for designing a composite material in which reinforcement fiber base materials are laminated, the composite material including a hole extending in a lamination direction of the reinforcement fiber base materials and a reinforcement part provided around the hole, the method comprising:
   calculating a strain value generated in the composite material based on design factors and a predetermined load condition, the design factors including a shape of the hole, a shape of the reinforcement part, and an orientation angle of each of the reinforcement fiber base materials in respective layers of the reinforcement part;
   optimizing the design factors based on a genetic algorithm such that the calculated strain value at a rim of the hole and the reinforcement part tends to decrease;
   the genetic algorithm including:
      generating a piece of genetic information on the shape of the hole, a piece of genetic information on the shape of the reinforcement part, and a piece of genetic information on the orientation angle according to a predetermined limiting condition to generate a plurality of individuals having the different pieces of genetic information;
      calculating the strain value generated in the composite material under the predetermined load condition based on an outer peripheral shape of the outermost layer of the reinforcement part in one quadrant for each of the individuals, wherein the outer peripheral shape of the outermost layer of the reinforcement part in the one quadrant is determined by interpolating a first reinforcement part defining point, a second reinforcement part defining point, and a third reinforcement part defining point according to the predetermined limiting condition that is an allowable range;
      sequentially selecting at least two individuals, one of the at least two individuals having smallest strain values relative to other individuals;
      genetically manipulating the pieces of genetic information using the selected individuals to newly generate individuals having the different genetic information; and
      calculating, when a predetermined condition is met while repeatedly performing the calculating of the strain value and the genetically manipulating on the individuals generated at the genetically manipulating, an individual having the smallest strain value among the individuals as an optimal solution;
   and manufacturing the composite material based on the optimized design factors,
   wherein the outer peripheral shape of an outermost layer of the reinforcement part includes the first reinforcement part defining point, the second reinforcement part defining point, and the third reinforcement part defining point in one quadrant in an X-Y coordinate system orthogonal to the lamination direction,
   the first reinforcement part defining point is a preset coordinate point on a Y-axis,
   the second reinforcement part defining point is a coordinate point neither on an X-axis nor on the Y-axis, the third reinforcement part defining point is a coordinate point on the X-axis, and the piece of genetic information on the shape of the reinforcement part is information on an X-coordinate of the second reinforcement part defining point, a Y-coordinate of the second reinforcement part defining point, and an X-coordinate of the third reinforcement part defining point.

2. The computer-implemented method according to claim 1, wherein each of the individuals includes the piece of genetic information on the shape of the hole, the piece of genetic information on the shape of the reinforcement part, and the piece of genetic information on the orientation angle, and the method further comprises calculating optimal solutions for the shape of the hole, the shape of the reinforcement part, and the orientation angle en masse.

3. The computer-implemented method according to claim 1, wherein each of the individuals is one of an individual for the piece of genetic information on the shape of the hole, an individual for the piece of genetic information on the shape of the reinforcement part, and an individual for the piece of genetic information on the orientation angle, and the method further comprises calculating optimal solutions in the order of the shape of the hole, the shape of the reinforcement part, and the orientation angle.

4. The computer-implemented method according to claim 1, wherein the shape of the hole includes a first hole defining point, a second hole defining point, and a third hole defining point in one quadrant in an X-Y coordinate system orthogonal to the lamination direction, the first hole defining point is a preset coordinate point on a Y-axis, the second hole defining point is a coordinate point neither on an X-axis nor on the Y-axis, the third hole defining point is a coordinate point on the X-axis, the piece of genetic information on the shape of the hole is information on an X-coordinate of the second hole defining point, a Y-coordinate of the second hole defining point, and an X-coordinate of the third hole defining point, and the calculating the strain value generated in the composite material under the predetermined load condition further includes interpolating the first hole defining point, the second hole defining point, and the third hole defining point to calculate the shape of the hole in the one quadrant for each of the individuals, and calculating the strain value generated in the composite material based on the calculated shape of the hole.

* * * * *